US011970325B2

(12) United States Patent
Boshaw et al.

(10) Patent No.: US 11,970,325 B2
(45) Date of Patent: Apr. 30, 2024

(54) CONFORMABLE RECYCLABLE SHIPPING CONTAINER

(71) Applicant: PAC WORLDWIDE CORPORATION, Redmond, WA (US)

(72) Inventors: James Boshaw, Bellevue, WA (US); Paul Neal, Fairfield, OH (US); Brian Kendall, Mainville, OH (US); Murray Fullerton, Auckland (NZ)

(73) Assignee: PAC WORLDWIDE CORPORATION, Redmond, WA (US)

( * ) Notice: Subject to any disclaimer, the term of this patent is extended or adjusted under 35 U.S.C. 154(b) by 0 days.

(21) Appl. No.: 17/778,339

(22) PCT Filed: Nov. 23, 2020

(86) PCT No.: PCT/US2020/061877
§ 371 (c)(1),
(2) Date: May 19, 2022

(87) PCT Pub. No.: WO2021/102438
PCT Pub. Date: May 27, 2021

(65) Prior Publication Data
US 2022/0388750 A1    Dec. 8, 2022

Related U.S. Application Data

(60) Provisional application No. 62/939,398, filed on Nov. 22, 2019.

(51) Int. Cl.
*B65D 5/02* (2006.01)
*B65D 65/40* (2006.01)
*B65D 81/03* (2006.01)

(52) U.S. Cl.
CPC ........... *B65D 81/03* (2013.01); *B65D 65/403* (2013.01); *B65D 2565/385* (2013.01)

(58) Field of Classification Search
CPC ...... B65D 5/02; B65D 5/5023; B65D 5/0281; B65D 5/0227; B65D 5/10; B65D 5/445;
(Continued)

(56) References Cited

U.S. PATENT DOCUMENTS

| 367,527 A | 8/1887 | Keene |
| 956,540 A | 5/1910 | Norton |

(Continued)

FOREIGN PATENT DOCUMENTS

| CN | 102527798 A | 7/2012 | |
| EP | 2492203 A1 * | 8/2012 | ............. B65D 5/029 |

(Continued)

OTHER PUBLICATIONS

Stewart, "Ingenious Cardboard Packaging Folds to Fit Parcels of Any Shape," Aug. 30, 2014, URL=https://inhabitat.com/ingenious-cardboard-packaging-folds-to-fit-any-shapei, retrieved on Aug. 23, 2023. (4 pages).

*Primary Examiner* — King M Chu
(74) *Attorney, Agent, or Firm* — Seed IP Law Group LLP (57) ABSTRACT

A shipping container made of two panels each made of recyclable, single face corrugated paper comprising an outer liner with corrugated medium. In one embodiment, the panels are formed from a large blank, that is folded in half and joined at their side edges. The flutes on the corrugated mediums are parallel and longitudinally aligned with the shipping container's longitudinal axis. The top edge of each panel is detached and form a top opening into an interior pocket formed between the two panels. Formed or attach to one panel is a top flap configured to be folded over and selectively attached to the opposite panel to close the top opening, Formed on each corrugated medium is at least one set of score lines of various geometric shapes and orientations. The score lines act as folding lines that enable the panels to bend along different axes so that the overall shape (Continued)

of the shipping container better conforms to the object placed in the interior pocket. The sizes of flutes on each panel may be the same size or vary in size. The flutes on opposite panels may be axially aligned or offset. Improved side edges attachment features are provided that reduce side edge separation and reduce thickness.

25 Claims, 12 Drawing Sheets

(58) Field of Classification Search
CPC .......... B65D 5/20; B65D 27/14; B65D 81/03; B31B 2100/00
USPC ............... 206/592; 229/75, 939, 165, 125.19
See application file for complete search history.

(56) References Cited

U.S. PATENT DOCUMENTS

| | | | |
|---|---|---|---|
| 1,987,461 A | 1/1935 | Bocye | |
| 2,503,874 A | 4/1950 | Ives | |
| 2,791,369 A | 5/1957 | Paige | |
| 3,144,979 A | 8/1964 | Young | |
| 3,281,050 A * | 10/1966 | Suchodolski | B65D 5/02 229/920 |
| 3,419,937 A | 1/1969 | Bally | |
| 3,501,084 A * | 3/1970 | Harrison | B65D 65/44 206/521 |
| 3,513,054 A | 5/1970 | Rene | |
| 3,743,173 A * | 7/1973 | Lasker | B65D 27/02 206/521 |
| 3,746,593 A | 7/1973 | Majewski | |
| 3,866,750 A | 2/1975 | Collin | |
| 3,896,650 A | 7/1975 | O'Konski | |
| 4,153,664 A | 5/1979 | Sabee | |
| 4,174,803 A | 11/1979 | Shrontz et al. | |
| 4,344,379 A | 8/1982 | Roberts | |
| 4,363,616 A | 12/1982 | Thomas | |
| 4,531,996 A | 7/1985 | Sukenik | |
| 4,589,552 A | 5/1986 | Chevalier | |
| 4,693,413 A | 9/1987 | McFarland et al. | |
| 4,809,904 A | 3/1989 | Yasutaniya | |
| 4,853,072 A | 8/1989 | Thompson | |
| 5,096,407 A | 3/1992 | Nebeling | |
| 5,188,265 A | 2/1993 | Capy | |
| 5,690,601 A | 11/1997 | Cummings et al. | |
| 5,693,167 A | 12/1997 | Cahill et al. | |
| 5,794,758 A | 8/1998 | Bakker et al. | |
| 6,461,559 B1 | 10/2002 | Bar | |
| 6,820,799 B2 | 11/2004 | Makofsky et al. | |
| 6,902,103 B2 | 6/2005 | Machery | |
| 8,562,216 B2 * | 10/2013 | Kendall | B65D 27/14 383/207 |
| 10,363,717 B2 | 7/2019 | Greenfield | |
| 2011/0177299 A1 | 7/2011 | Van Berlo | |

FOREIGN PATENT DOCUMENTS

| | | | |
|---|---|---|---|
| EP | 2492203 A1 | | 8/2012 |
| GB | 2432148 A | | 5/2007 |
| GB | 2432148 B | | 9/2009 |
| JP | 2010-208310 | * | 9/2010 |
| JP | 2010208310 A | | 9/2010 |
| MX | 2017009706 A | | 2/2019 |
| WO | WO 2010025751 A1 | | 3/2010 |
| WO | WO 2019210046 A1 | | 10/2019 |
| WO | WO 2022015603 A1 | | 1/2022 |

* cited by examiner

CONFORMABLE RECYCLABLE SHIPPING CONTAINER

TECHNICAL FIELD

This invention pertains to shipping containers, and more particularly to shipping containers made of material designed to partially conform to an object placed inside the shipping container.

BACKGROUND ART

Online retailers sell thousands of objects which are shipped to consumers. The objects come in different shapes and sizes and are usually distributed to consumers in outer packages.

Many online retailers use lightweight, inexpensive, flat envelopes called plastic bubble mailers to send products to customers. Most bubble mailers are made of multiple components, such as paper and plastic, can be recycled if the components are manually separated and delivered to a recycling facility that recycles the component. Unfortunately, most customers are unaware that the components must be separated and recycled so many bubble mailers used today still end up in landfills. Ideally, an alternative lightweight, inexpensive flat envelope made of corrugated paper that is 100% recyclable that can be directly placed in standard paper recyclable bin used by most homeowners and businesses is needed.

Mailers are manufactured in different sizes and shapes to accommodate different products. Because larger mailers are more expensive than smaller mailers, and take up more storage space than smaller mailers, and take up more shipping space than smaller packages, retailers try to use the smallest possible shipping container which can safely hold and protect the product. If a mailer is used that is larger than necessary to hold product, dead spaces may be created inside the mailer that allows the product to move inside the mailer during shipment. Sometimes, the retailer will add filler material to eliminate the dead spaces.

Sellers that ship large quantities of products to their customers must keep large quantities of empty shipping containers on hand. The size, shape and volume of the empty shipping containers determine the shipping container's shipping density. Generally, the more shipping containers that can be stored in a shipping box or bin, the less storage space for empty shipping containers is required by the seller.

What is needed is an improved flat, envelope-style shipping container made of non-recyclable material with two panels made of inner corrugated mediums that can be selectively manipulated to better conform the shipping container to different size and shape products. What is also needed is an improved shipping container that requires less storage space when in an empty configuration.

DISCLOSURE OF THE INVENTION

A conformable recyclable shipping container that includes at least two panels each with a paper outer liner and an interior paper corrugated medium. In one embodiment, the shipping container is made from a rectilinear or square blank designed to be folded in half to form stacked first and second panels For discussion and illustration purposes, the flat shipping container is an envelope style container, called a mailer. It should be understood the shipping container may be different shapes and sizes and used for different purposes and not limited to the shipping industry.

In one embodiment, the blank is made of single face corrugate that includes a paper outer lining and paper corrugated medium. In the embodiments shown, the corrugated medium includes 'B' size flutes (approximately ⅛ inch). It should be understood however the other size flutes (i.e. A-N) may be used.

Formed in the blank is a transverse, center crease line that divides the blank into a first panel and a second panel. When the blank is folded around the crease line, the first panel and second panel are aligned, registered, and stacked with their corrugated mediums facing inward. At least two of the side perimeter edges of the first and second panels are joined and form a large single interior pocket.

The flutes on the corrugated mediums are parallel and longitudinally aligned with the blank's longitudinal axis. The sizes of the flutes on each panel may be the same size or they may be different sizes. The spacing between flutes may be same or may also vary. The flutes on opposite panels may be axially aligned or offset. Also, different areas on each panel may have different size flutes or include crushed areas where the flutes have been flattened during manufacturing.

The top edge of each panel is detached forming a top opening into the interior pocket. Formed or attached to first panel is a top flap configured to be folded over and selectively attached to the outside surface of the opposite second panel to close the top opening. In one embodiment, a narrow flat section is formed adjacent to the top flap that forms a greater folding and contact area for the top flap when folded over the top edge of the second panel. Applied to the inside surface of the top flap is a suitable adhesive covered by a removable liner. The top flap may also include a tear strip that when pulled, tears the top flap, and separates it creating an opening to an internal pocket formed in the shipping container.

In another embodiment, the second panel may include a support flap that during assembly, folds over and attaches to the inside surface of the second panel to create a reinforced top edge.

Also, in another embodiment, the end section of each flute near the top opening may be crushed or flattened to form a beveled end surface enabling products to be more easily inserted into the interior pocket.

Formed on each panel and extending across the flutes are at least two score lines. The score lines act as supplemental folding lines in the main sections of the two panels that enable the shipper to independent bend each panel at different locations along the score lines to conform shipping container to the object placed in the interior pocket. In one embodiment, the score lines are parallel and diagonally aligned relative to the longitudinal axis of the flutes. The score lines may extend across the entire panel or part of the panel. The score lines on two panels may be aligned and registered or offset. Also, the width and depth of the score lines may be vary depending on the size and spacing of the flutes formed in the corrugated medium and the amount of bending desired.

The shipping container also includes improved side edges attachment features that securely join the adjacent side edges of the two panels. In one embodiment, the improved side edge attachment feature are two side edge extensions formed on each panel each with longitudinally aligned small flutes ('F' flutes). In another embodiment, two side edge extensions are formed on one panel and straight perimeter edges are formed on the opposite panel. The side edge extensions are configured to wrap around the straight perimeter edge and attached with an adhesive to the outside surface of the opposite panel. When used with an adhesive, the small flutes increase the contact surfaces for the adhesive.

In another embodiment, each panel includes straight perimeter edges. A section on each panel adjacent to the perimeter edge may include small flutes ('F' flutes). When used with and adhesive the small flutes ('F' flutes) increases the contact area between the two joined surfaces that resist separation.

In both embodiments, because the small flutes nest, the overall thickness of the shipping container near its perimeter edges is reduced which increases shipping density.

BEST MODE FOR CARRYING OUT THE INVENTION

Referring to the Figs there is shown a conformable recyclable shipping container 10 that includes two panels 20, 40 each with an outer liner and a corrugated medium. In one embodiment, the shipping container 10 is made from a rectilinear or square blank 12 made of single face corrugated with a paper outer liner 15 and paper corrugated medium 16. The blank 12 is folded in half to form stacked first and second panels 20, 40. For discussion and illustration purposes, the flat shipping container 10 is an envelope-style container 10, often called a 'mailer'. It should be understood that the shipping container 10 may be different shapes and sizes and used for different purposes. In the embodiments shown, the corrugated medium 16 includes 'B' size flutes 18 (approximately ⅛ inch wide). It should also be understood that the corrugated medium 16 is not limited to 'B' flutes and other flute sizes may be used (i.e. A-N)

Figures 1, 2:
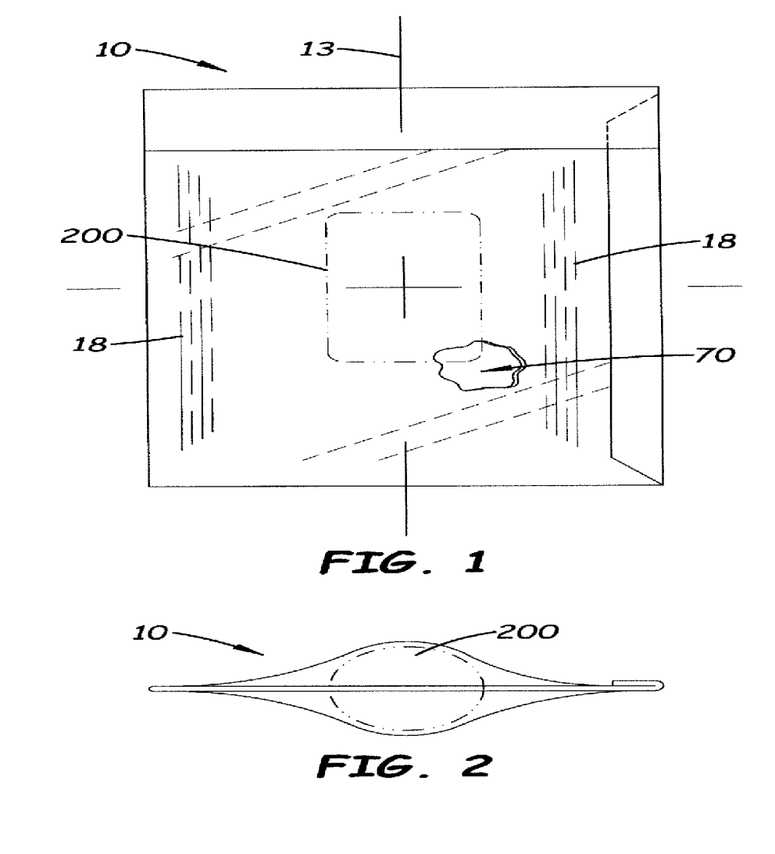
FIG. 1 is a top plan view of the shipping container disclosed herein with a beverage can placed inside the shipping container.
FIG. 2 is a right-side elevational view of the shipping container shown in FIG. 1.
Figure 4:
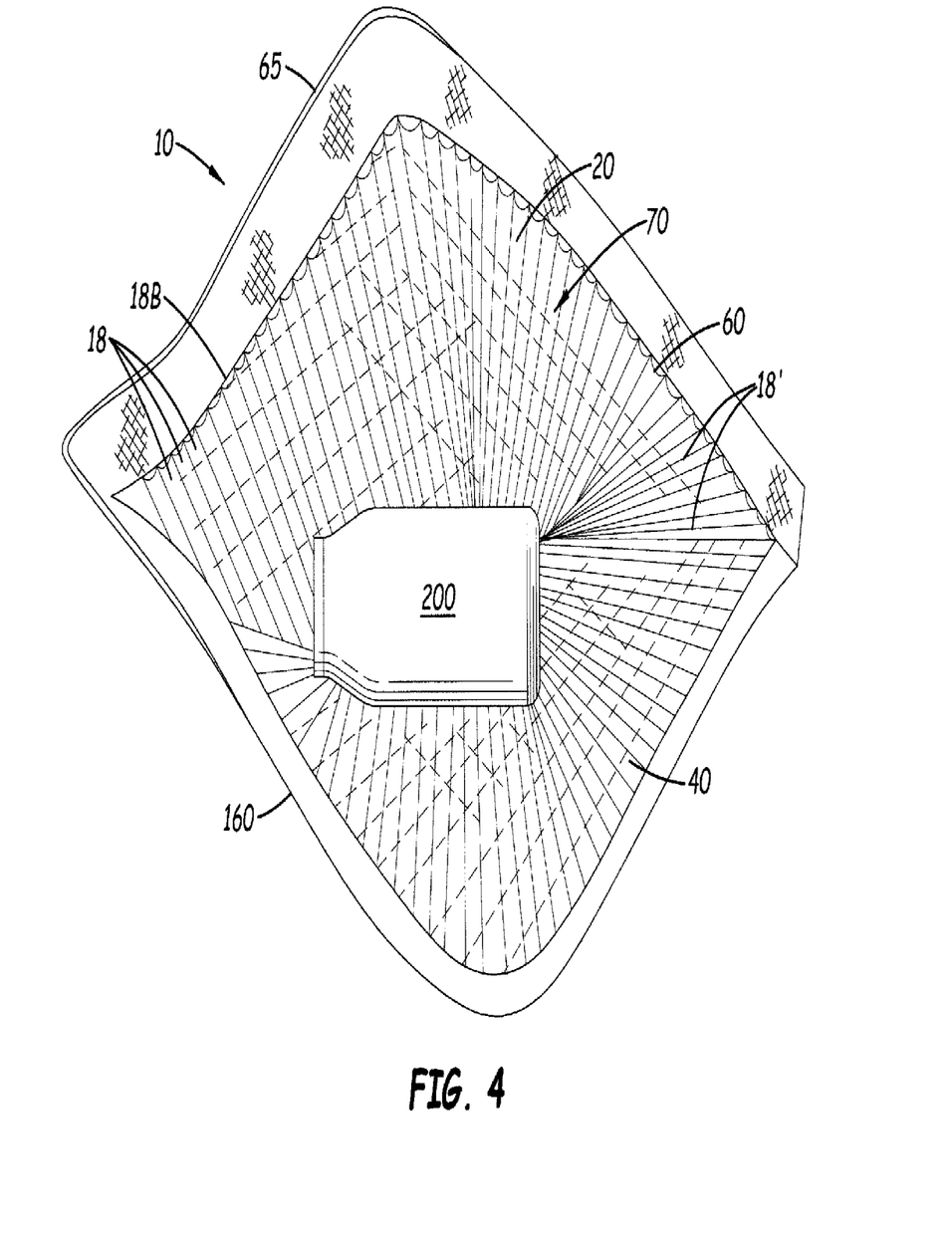
FIG. 4 is a top plan view of the shipping container with the top opening opened showing an internal pocket and a beverage container placed inside the internal pocket.

The blank 12 includes a longitudinal axis 13 and transverse, mid-line axis 14. Formed in the blank 12 near the transverse mid-line axis 14 is a transverse crease line 19 that divides the blank 12 into two substantially equal size first panel 20 and second panel 40. When the blank 12 is folded around the crease line 19, the first panel 20 and second panel 40 are aligned, registered, and stacked with their corrugated mediums facing inward. The lower edges 30, 50 of the first panel 20 and the second panel 40, respectively, are integrally attached and the two side perimeter edges 32, 34 and 52, 54 of the first panel 20 and the second panel 40, respectively, are joined to form a large single interior pocket 70 as shown in FIGS. 1 and 4.

The flutes 18 on the corrugated mediums on each panel 20, 40 are parallel and longitudinally aligned with the blank's longitudinal axis 13. The sizes of the flutes 18 on each panel 20, 40 may be the same size or they may be different sizes. Also, the spacing between the flutes 18 may be uniform or they may vary. The flutes 18 on opposite panels 20, 40 may also be axially aligned or offset enabling the flutes on opposite panels to nest. Also, different areas on the corrugated medium used on each panel 20, 40 may have different size flutes 18 or include crushed areas 18a where the flutes 18 have either been flattened or not created during manufacturing.

The top edge of each panel 20, 40 is detached forming a top opening 60 into an interior pocket 70. Formed or attached to first panel 20 is a top flap 62 configured to be folded over and selectively attached to the outside surface of the outer liner on the second panel 40 to close the top opening 60. In one embodiment, the top flap 62 includes an extension section 63 that forms a larger folding and contact area for the top flap 62 when folded over the top edge 44 of the second panel 40. Applied to the inside surface of the top flap 62 is a suitable adhesive 64 covered by a removable liner 65. The top flap 62 may also include a tear strip 66 (see FIG. 6) that when pulled, tears the top flap 62 and separates it from the second panel 40. When the top flap 62 is removed an opening is created into the internal pocket 70

As shown in FIGS. 4, 5, 7, 8 and 9, the end section 18B of each flute 18 near the top flap 62 may also be crushed or flattened to form a beveled end surface enabling products to be more easily inserted into the interior pocket 70.

Figure 5:
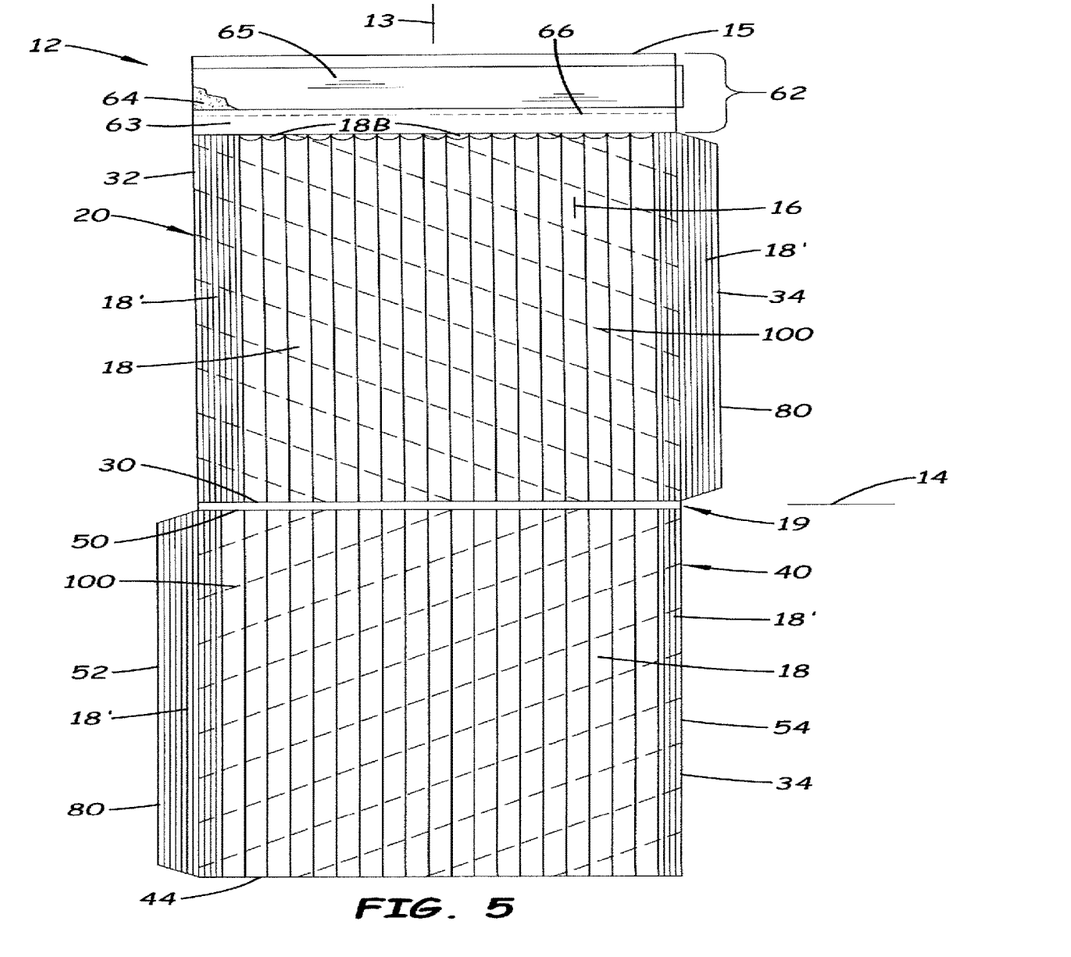
FIG. 5 is a top plan view of one embodiment of a blank made of single face corrugate made up of an outer liner and a corrugated medium with a plurality of flutes and with diagonally aligned score lines formed on the corrugated medium, the blank being configured to be folded in half to form a first panel and a second panel each with at least one side edge extension.

FIG. 5 is a plan view of one embodiment of a blank 12 made of single face corrugated paper with wide side edge extensions 80 formed on each panel 20, 40 designed to form a wrap seal along the sides of the shipping container 10. FIG. 5 also shows flutes 18 on panels 20 and 40 being longitudinally offset so the flutes 18 nest when the shipping container 10 is in a flat configuration.

Figure 7:
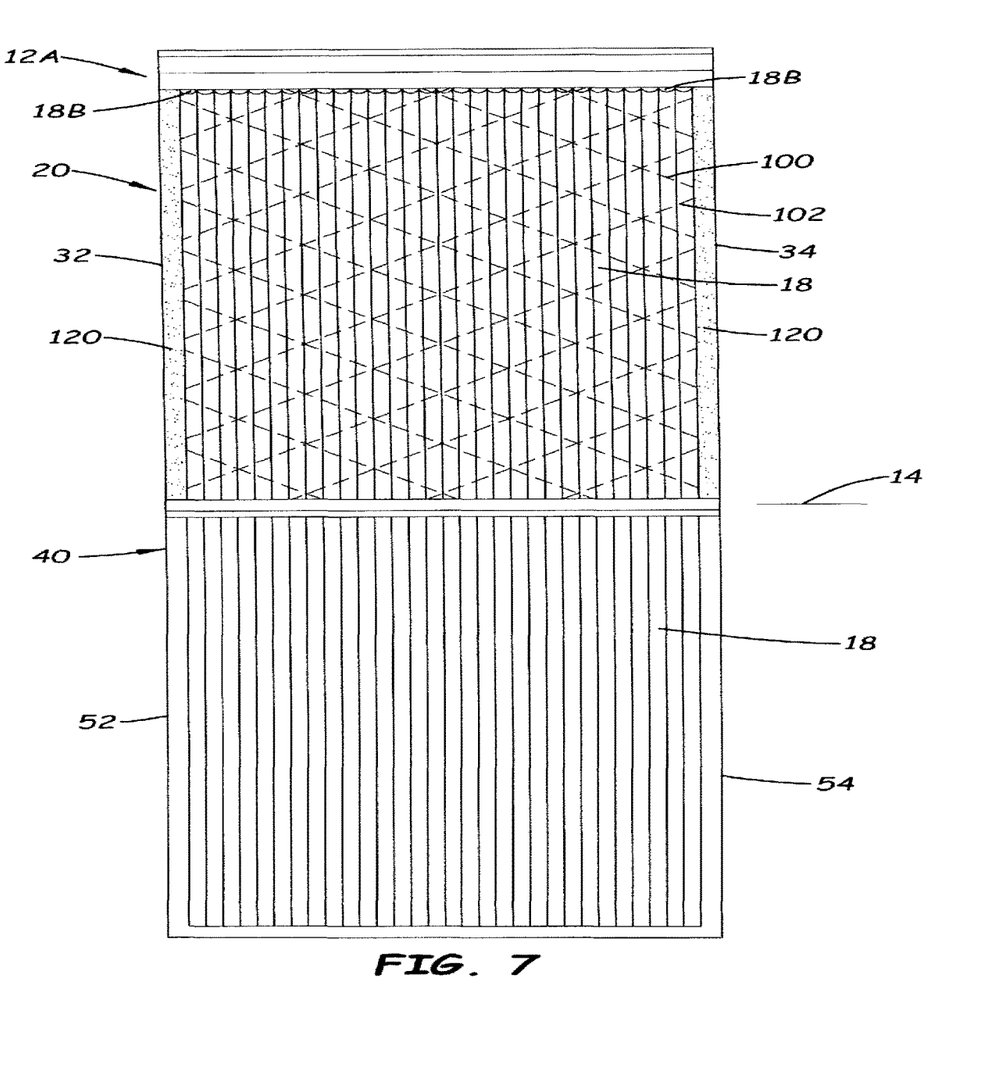
FIG. 7 is a plan view of another embodiment of a blank made of single face corrugate also with a plurality of diagonally aligned score lines formed on the corrugated medium similar to the blank shown in FIGS. 5 and 6, each panel includes two straight side edges with a layer of adhesive on each side edge.

FIG. 7 is a plan view of another embodiment of a blank, denoted 12A, also made of single face corrugate also with a plurality of longitudinally aligned flutes 18. The blank 12A is configured to be folded in half to form a first panel and a second panel each with a layer of adhesive on each side edge. The side edges 32, 34 of the first panel and side edges 52, 54 of the second panel 40 are straight designed to be stacked together and attached with an adhesive 120 applied to the edges.

Formed on each panel 20, 40 and extending across the flutes 18 are at least two score lines 100-106 The score lines 100-106 are non-perforating indentations formed in the flutes 18 and act as supplemental folding lines enable each panel 20, 40 to independently bend along different axes so the overall shape of the shipping container 10 better conforms to the object 100 placed in the interior pocket 70. The score lines 100-106 may extend across the entire panel or a part of the panel. The score lines 100-106 on the two panels 20, 40 may be aligned and registered or offset. Also, the width and depth of the score lines 100-106 may be vary depending on the size and spacing of the flutes 18 formed in the corrugated medium and the amount of bending desired.

In FIG. 5, shows a plurality of diagonally aligned score lines 100 formed the corrugated medium on each panel 20, 40. They score lines 100 are oriented from 5 degrees to 85 degrees from the longitudinal axis of the flutes 18. FIG. 5 shows the score lines 100 on the panels 20, 40 in different directions. It should be understood that the number, the location, the position, and the spacing of the score lines 100 may vary on each panel 20, 40.

In FIG. 7, shows another embodiment of the blank 12A with a minimum of two sets of score lines (score lines 100, 102 shown) formed on the first panel 20 and no score lines are formed on the second panel 40. In FIG. 7, the two sets of score lines 100, 102 are aligned in opposite directions at approximately 45 degrees from the longitudinal axes of the flutes 18.

Figure 8:
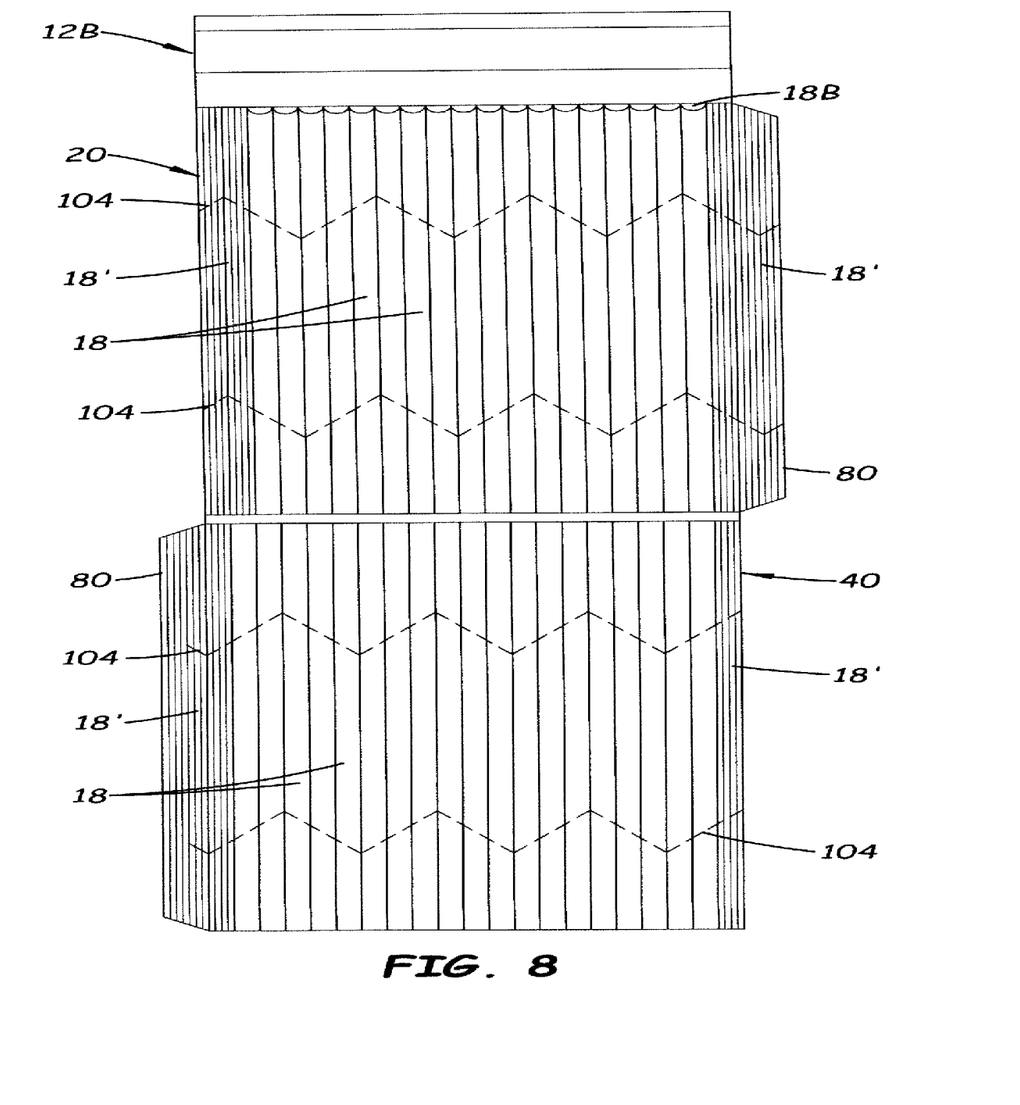
FIG. 8 is another embodiment of the blank like the blank shown in FIG. 5 with two zig-zag score lines formed on the corrugated medium on each panel.

FIG. 8 is another embodiment of the blank 12B similar to the blank 12 shown in FIG. 5 with side edge extensions 80 with two sets of zig-zag score lines 104 formed to on the corrugated medium on each panel 20, 40. The zig-zag score lines 104 on each panel 20, 40 are shown as being parallel and extending transversely across each panel. It should be understood the number of zig-zag score lines 104 on a panel may vary, the orientation each zig zag score 104 on the two panels, and they may also be diagonally aligned of each panel.

Figure 9:
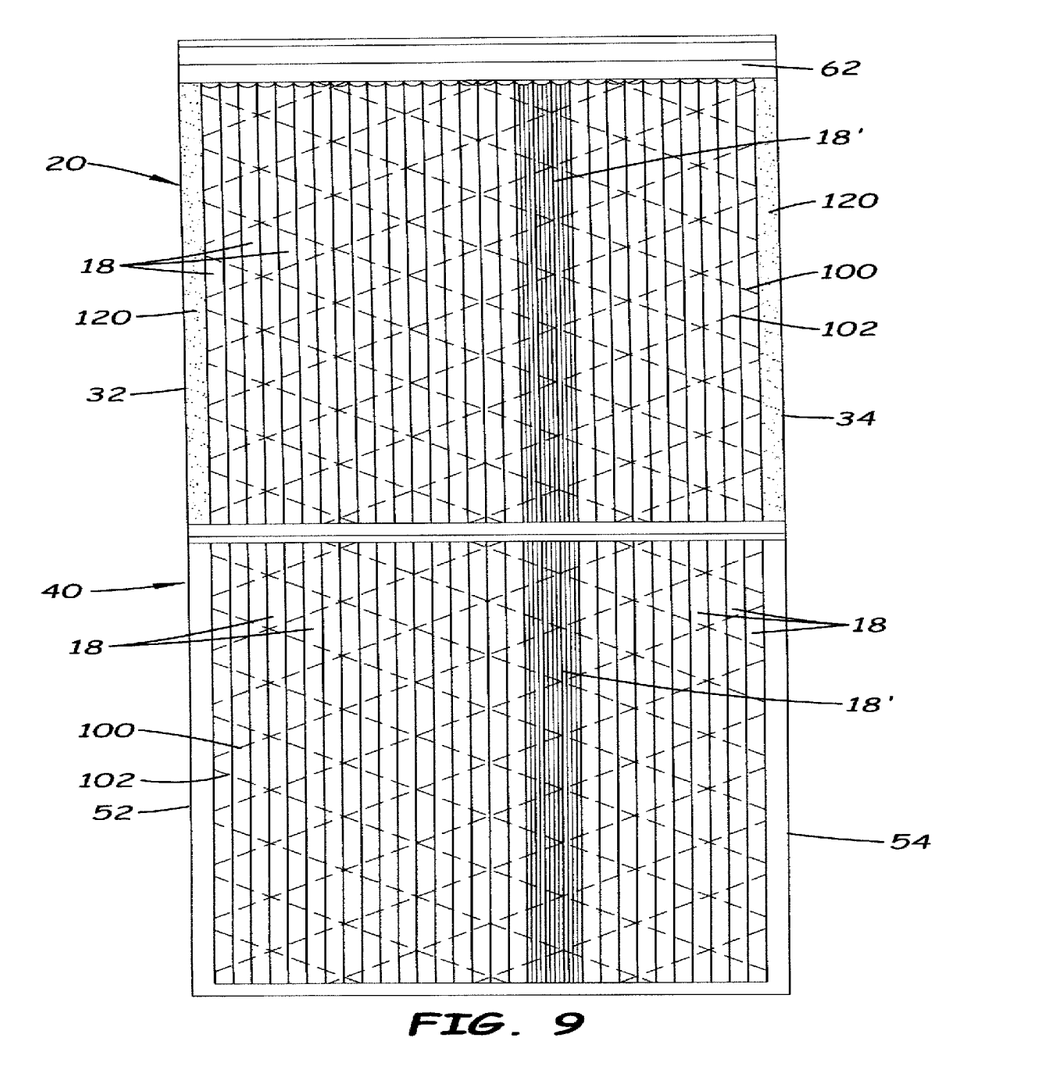
FIG. 9 is another embodiment of the blank like the blank shown in FIG. 7 with two sets of diagonal aligned score lines formed on the corrugated medium on each panel, also shown two flute sizes on each panel.

FIG. 9 is another embodiment of the blank 12C similar to the blank 12A shown in FIG. 7 with two sets of diagonal aligned score lines 100, 102 formed on the corrugated medium on each panel 20, 40. FIG. 9 also shows the spacing and orientation of the two diagonally aligned score lines 100, 102 on the first panel 20 and the second panel 40 may vary.

Another optional feature of the invention is that the size of flutes 18 used in the first panel 20 and second panel 40 may vary. In one embodiment, the same size flutes 18 are used in both the first panel 20 and the second panel 40. As stated above, the flutes 18 may be axially aligned or offset. FIGS. 5, 8 and 9 also show small flutes 18' ('F' flutes) formed on the first panel 20 and second panel 40. The small flute 18' may be formed at different locations in the main body of each panel 20, 40 or they may be formed near the perimeter edges 32, 34, and 52, 54 as discussed further below.

Figure 3:
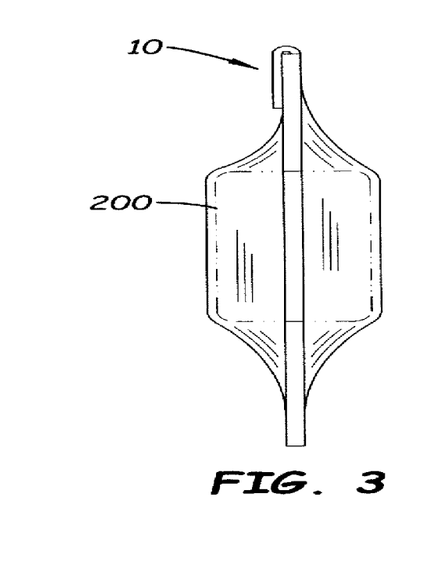
FIG. 3 is a front side elevational view of the shipping container shown in FIG. 1.
Figure 10:
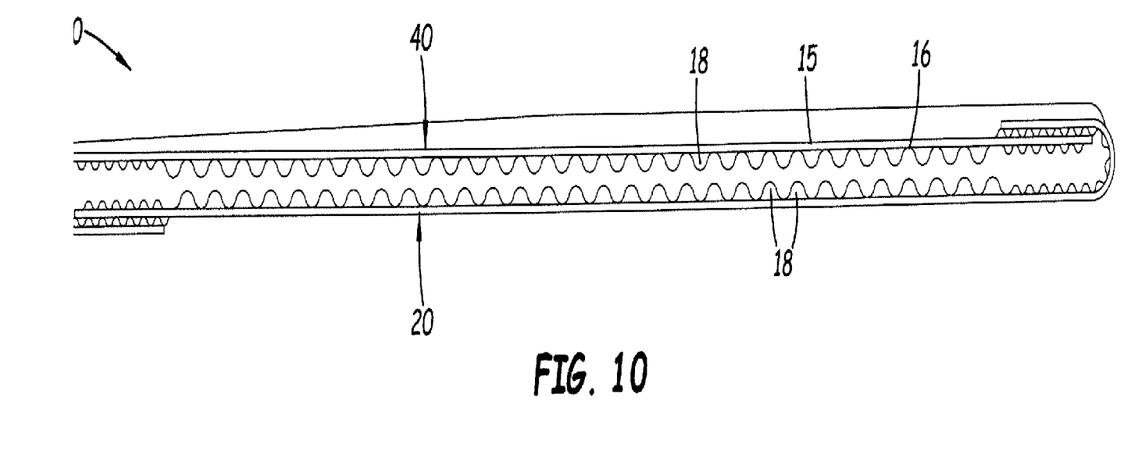
FIG. 10 is a sectional view of the closed shipping container with the first and second panels folded over.

FIG. 10 is a sectional view of the shipping container 10 with the beverage container 200 shown in FIGS. 1-3 removed.

Figure 11:
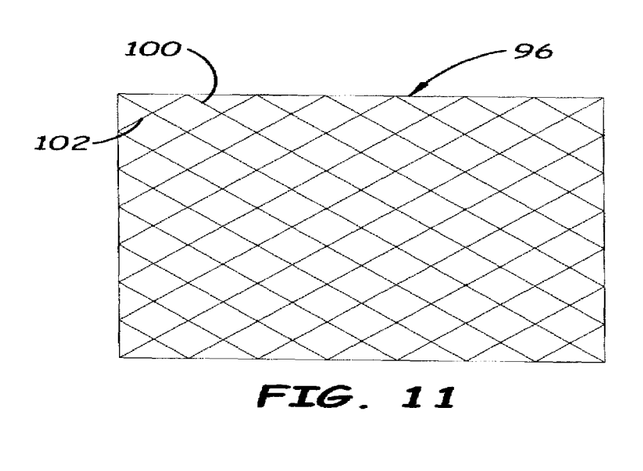
FIG. 11 is an illustration showing the scorings in a 45-degree diamond scoring line pattern.
Figure 12:
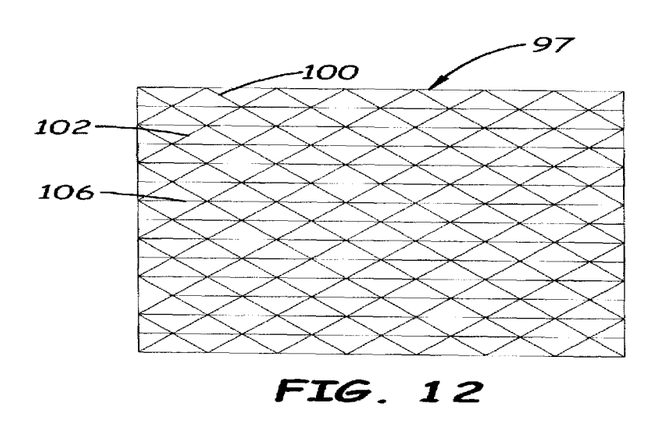
FIG. 12 is an illustration showing the scoring lines in a 45-degree triangular scoring line pattern.
Figure 13:
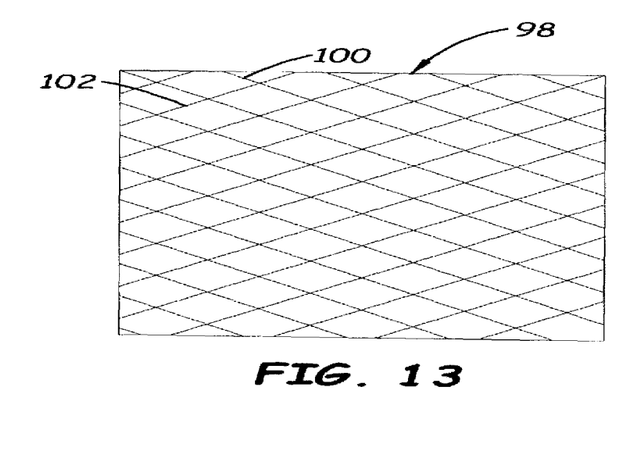
FIG. 13 is an illustration showing the scoring lines in a 60-degree diamond scoring line pattern.
Figure 14:
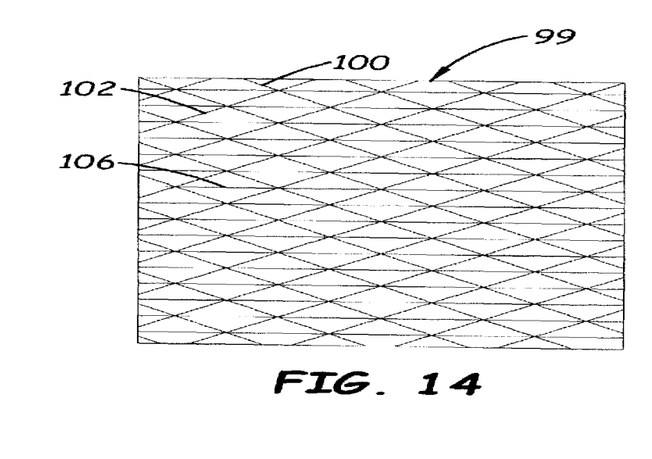
FIG. 14 is an illustration showing the scoring lines in a 60-degree triangular scoring pattern.

In addition to the simple patterns shown in FIGS. 5, 7 and 8, FIGS. 11-14 show four complex scoring line patterns 96, 97, 98, 99, respectively, may be used on the first and second panels 20, 40. As stated above, the angles of each score lines 100, 102, 104, and 106 may vary. For example, FIG. 11 shows two score lines 100, 102 oriented to form a 45-degree diamond scoring line pattern 96. FIG. 12 shows three score lines, 100, 102, and 104 oriented to form a 45-degree triangular scoring line pattern 97. FIG. 13 shows two score lines 100, 102 oriented to form a 60-degree diamond scoring line pattern 98. FIG. 14 shows three score lines 100, 102, and 106 oriented to form 60-degree triangular scoring pattern 99.

Figure 15:
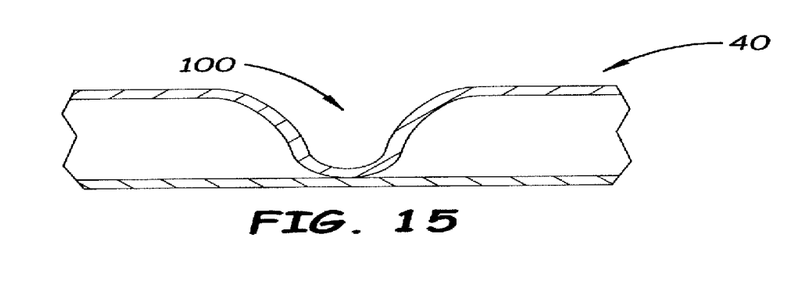
FIGS. 15-17 show three different profiles of a scoring line in a flute.
Figure 16:
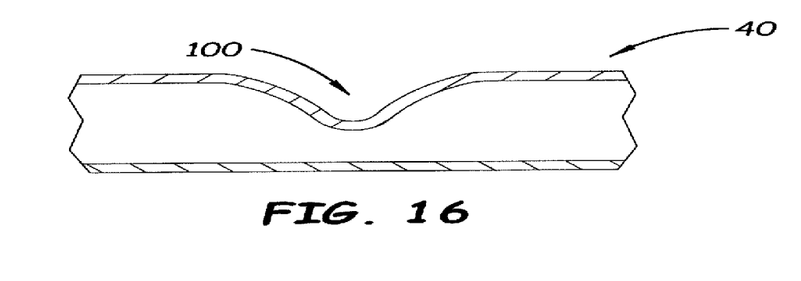
Figure 17:
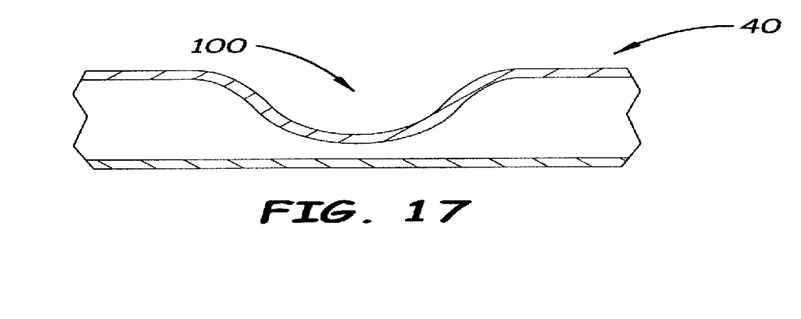
Figure 18:
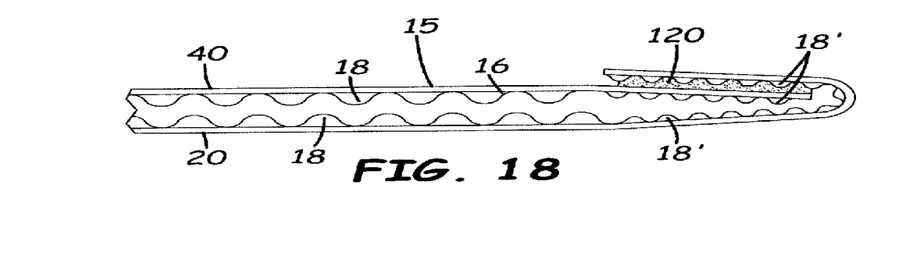
FIG. 18 is a partial side elevational view of the shipping container showing an outer side wrap extension formed on one panel extending around the straight side edge on opposite panel, formed on the inside surfaces of the first and second panels are smaller flutes that nest to reduce to overall thickness of the shipping container along its perimeter edge, an adhesive is used to hold the outer side wrap extension on the first extension in place around the outsider surface of the opposite panel.
Figure 19:
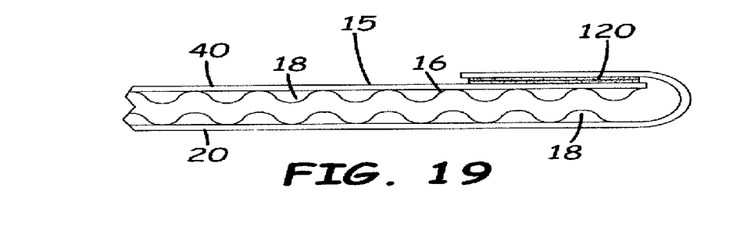
FIG. 19 is a partial side elevational view of the shipping container showing an outer side wrap extension formed on one panel with a flat surface being extended around the adjacent side edge on the opposite panel and attached with an adhesive.
Figure 20:
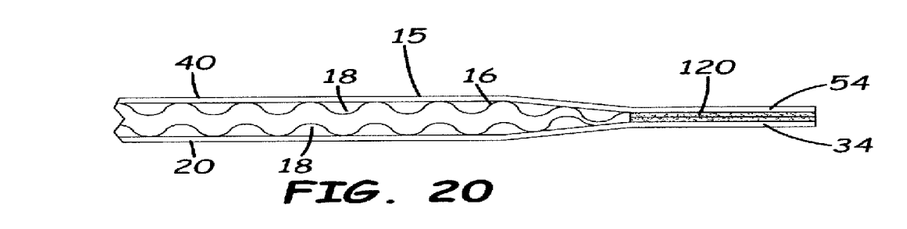
FIG. 20 is a partial side elevational view of the shipping container showing two panel each with straight side edges, when the panels are folded together the stacked side edges on are registered and aligned and attached with an adhesive.
Figure 21:
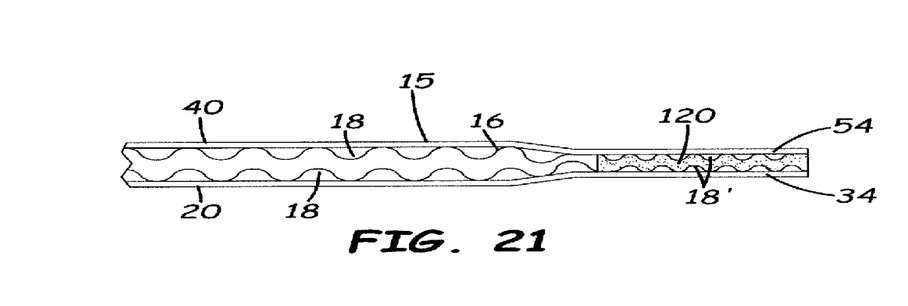
FIG. 21 is a partial side elevational view of the shipping container showing two panels folded together with the two straight side edges with smaller flutes formed on their inside surfaces that are configured to nest and then attached with an adhesive.

The profile shape of each score line 100, 102, 104, and 106 may also vary. For example, FIGS. 15-17 show end profiles of three non-perforated score lines (score line 100 shown only) formed in a flute 20 in the corrugated medium. It should be understood that the invention is not limited to these score line patterns or profiles.

Figure 6:
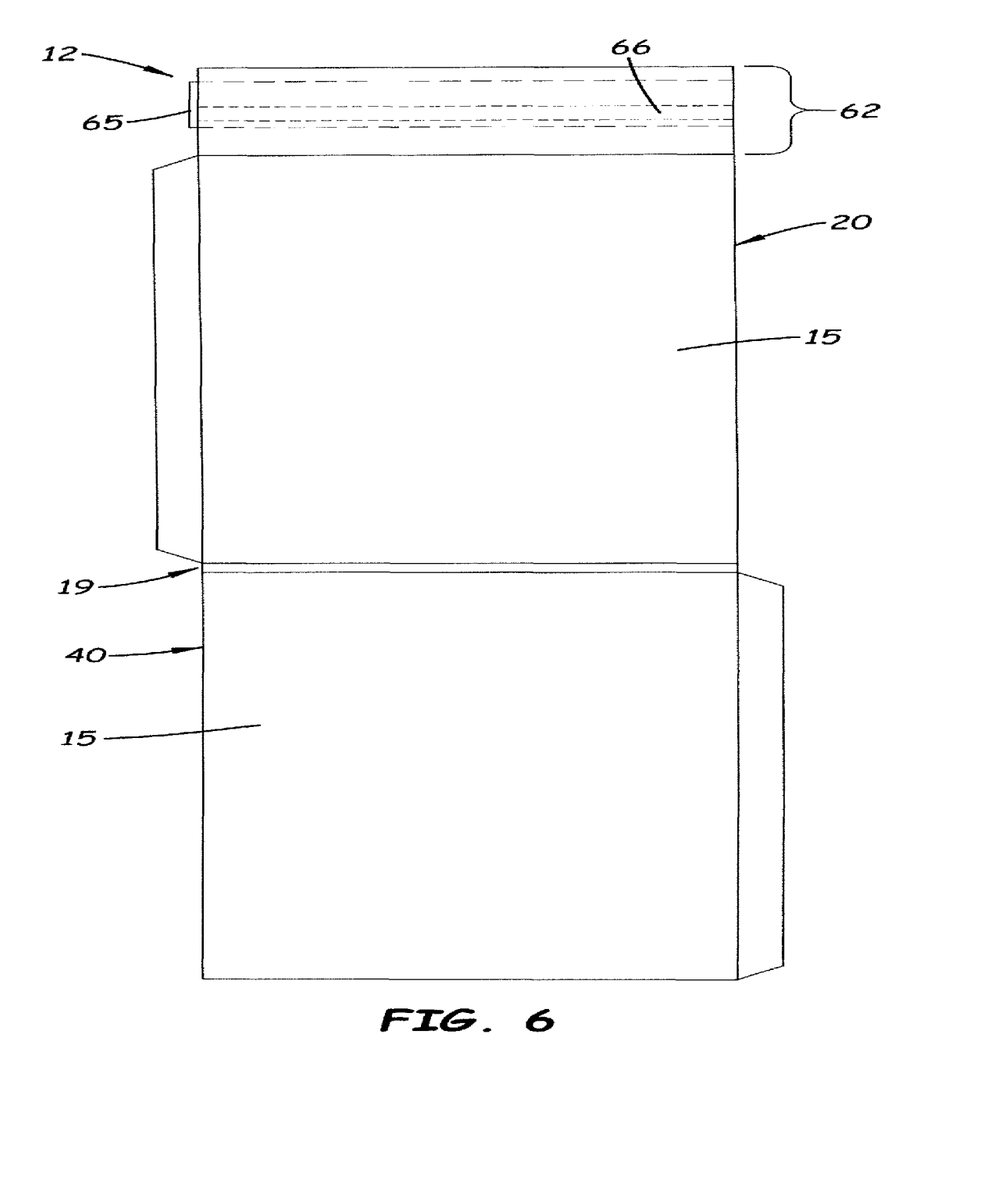
FIG. 6 is a bottom plan view of the blank shown in FIG. 5.

The shipping container 10 also includes improved side edges attachment features that that securely join adjacent side edges of the panels and reduce the thickness of the shipping container 10 along the perimeter edges. In one embodiment, as shown in FIGS. 5, 6, and 8, the side edge attachment feature are two side edge extensions 80 formed on each panel 20, 40. The side edge extensions 80 may be flat or may include longitudinally aligned small flutes 18' ('F' flutes). In the embodiment, two side edge extensions 80 are formed on one panel 20 or 40 or one side edge extension 80 is formed on opposite sides of each panel 20, 40. The side edge extension 80 is sufficiently wide to fold and wrap around the side edge on the adjacent panel. An adhesive 120 is used to attach the wrapped side edge extension to the outside surface of the opposite panel. In one embodiment, small flutes 18' located area adjacent to the side edge extensions 80 are parallel to the flutes used on the main body. The small flutes 18' may also be offset with the small flutes 18' on the opposite panel so that flutes 18' on the two panels 20, 40 may nest together.

FIGS. 7 and 9 show blank 12A, 12C with straight side edges 32, 34, 52, 54, that are aligned and registered when the blanks are folded. When folded and stacked, the straight side edges 32, 34, 52, 54 are adhesively attached with a suitable adhesive 120.

Use of the side edge extensions 80 enable the entire widths of the corrugated mediums on each panel 20, 40 to be used. The side edge extensions 80 may be flat or they may include small flutes 18' ('F' flutes). Because the side edge extensions 80 are thinner than the main body of the panels, 20, 40, the overall thickness of the side edges of the shipping container 10 is reduced which is important for increasing shipping density.

Figures 22, 23:
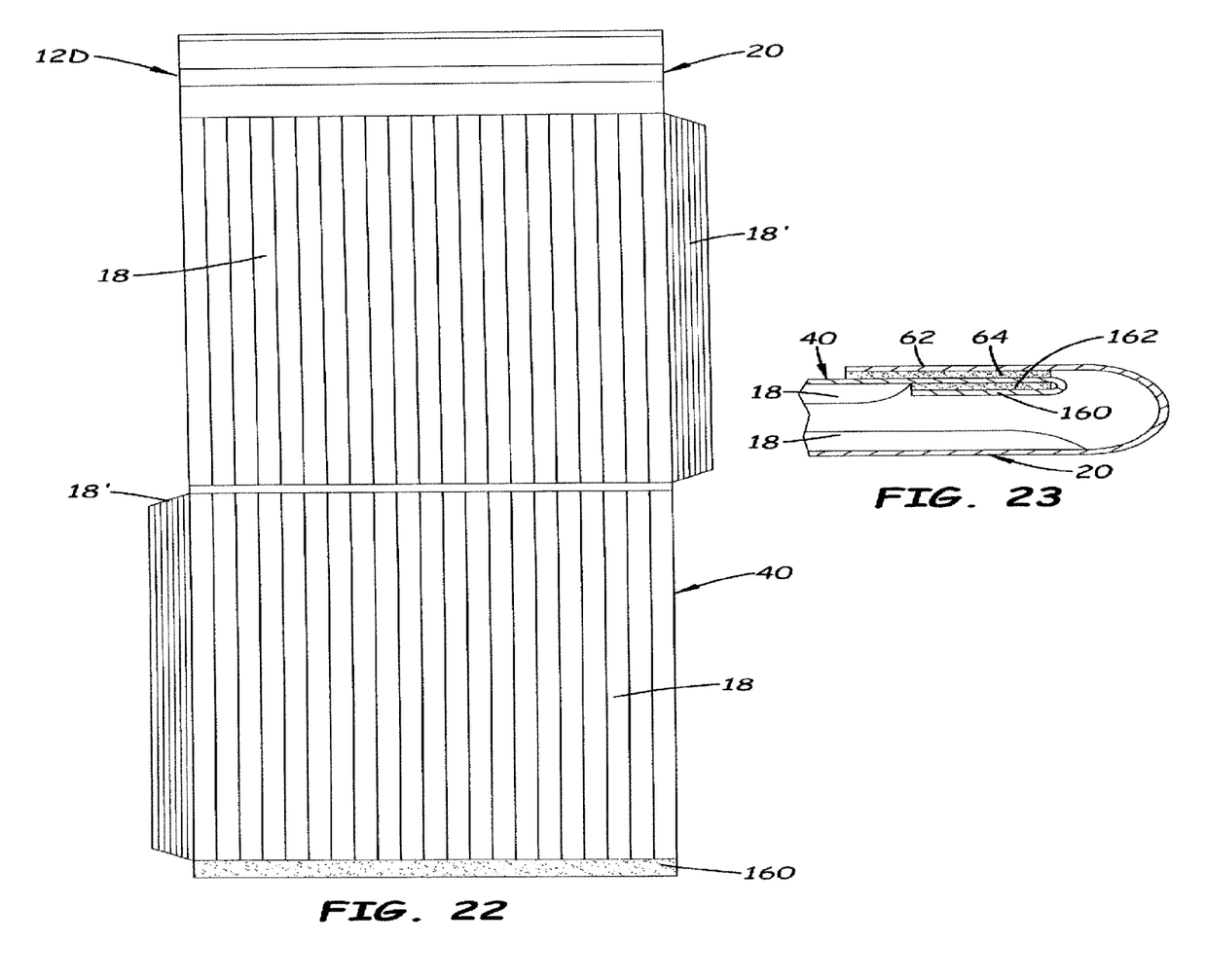
FIG. 22 is a plan view of one embodiment of a blank made of single face corrugate similar to the blank shown in FIG. 5 but without the diagonal score lines and an optional support flap formed on the upper edge of the second panel.
FIG. 23 is a sectional view of the mailer made with the blank shown in FIG. 22 with the support flap wrapped around the second panel to reinforce the leading edge of the second panel.

FIG. 22 is a plan view of one embodiment of a blank indicated by reference number 12D made of single face corrugate like the blank shown in FIG. 5 but without the diagonal score lines. During assembly, the second panel 40 is folded over the first panel. Attached to the top edge of the second panel 40 and an optional support flap 160 that provides support for the top edge of the second panel 40 making it easier to insert or remove objects from the shipping container.

FIG. 23 is a sectional view of the blank 12D when assembled into a mailer showing the support flap 160 g wrapped around the top edge of the second panel 40 and attached to the inside surface of the second panel 40 with an adhesive 162.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

INDUSTRIAL APPLICABILITY

This invention has utility in industries that used corrugated containers, such as in the shipping and mailing industries.

We claim:

1. A recyclable shipping container, comprising:
   a. a rectilinear or square blank including two side edges parallel to each other, a first edge, and a second edge parallel and opposite to said first edge, said blank being made of single face corrugate that includes a corrugated medium and an outer liner, said corrugated medium includes a plurality of flutes and each said flute of the plurality of flutes includes a longitudinal axis, said blank includes a fold line parallel to said first and second edges and transverse to said side edges, said fold line divides said blank into a first panel and a second panel, said first panel includes said first edge and said side edges, and said second panel includes said second edge and said side edges, and, in use, when said blank is folded along said fold line, said first panel overlaps said second panel and said side edges of said first panel are coupled to said side edges of said second panel, thereby forming a shipping container with an interior pocket lined with the plurality of flutes and an opening providing access to the interior pocket, said plurality of flutes being parallel to said side edges of said blank;
   b. a foldable extension flap extends along said second edge of said second panel of the blank, said foldable extension flap extends away and along said second edge of said second panel and is configured to be selectively folded over and coupled to said first edge of said first panel of the blank to close said interior pocket of said shipping container; and
   c. at least two parallel score lines on said first and second panels, said score lines on each of said first panel and said second panel extend diagonally across said flutes of said plurality of flutes of the first and second panels, respectively, thereby forming additional fold lines of said blank, wherein the additional fold lines line the interior pocket and provide conformability such that the first and second panels are configured to, in operation, conform to a shape of an object within the recyclable container.

2. The recyclable shipping container as recited in claim 1, further including a tear strip formed on or near said foldable extension flap, said tear strip configured to be selectively pulled to open said shipping container and access the interior pocket of said shipping container.

3. The recyclable shipping container as recited in claim 1, wherein said score lines are diagonally aligned to said longitudinal axes of said flutes at an angle ranging from 5 degrees to 85 degrees.

4. The recyclable shipping container as recited in claim 1, wherein each said score line extends in a straight line on said panels.

5. The recyclable shipping container as recited in claim 2, wherein said score lines are at least ¼ inch apart.

6. The recyclable shipping container as recited in claim 1, wherein each said score line has a zig-zag configuration.

7. The recyclable shipping container as recited in claim 1, wherein said score lines are oriented in a diamond-shaped pattern.

8. The recyclable shipping container as recited in claim 1, wherein a section of each said flute of the plurality of flutes near said opening is beveled towards said outer liner.

9. The recyclable shipping container as recited in claim 1, wherein said flutes of the plurality of flutes on at least one of said first panel or said second panel are the same size between A to N.

10. The recyclable shipping container as recited in claim 1, wherein said flutes of the plurality of flutes on said first panel and said second panel are the same size.

11. The recyclable shipping container as recited in claim 10, wherein said flutes of the plurality of flutes on said first panel are offset with said flutes of the plurality of flutes on said second panel, and said flutes on said first panel and on said second panel nest within each other.

12. The recyclable shipping container as recited in claim 1, wherein said flutes of the plurality of flutes on at least one of said first panel or second panel are different sizes.

13. The recyclable shipping container as recited in claim 1, wherein both said first panel and said second panel include a side wrap extension, each said side wrap extension of the first and second panels configured to be folded over said adjacent side edge of said opposite one of the first and second panels to connect said side edges of said first panel and said second panel.

14. The recyclable shipping container as recited in claim 13, further including a layer of adhesive located between and adjoining each said side wrap extension and adjacent opposite edge of said first and second panel, respectively.

15. The recyclable shipping container as recited in claim 13, wherein each said side wrap extension includes a plurality of flutes formed on an inside surface of said side wrap extensions, said flutes of the plurality of flutes of the side wrap extensions formed on said side wrap extensions are aligned parallel to and are smaller than said flutes of the plurality of flutes on said first panel and said second panel.

16. The recyclable shipping container as recited in claim 13, further including an adjacent edge area formed on said first panel and said second panel adjacent to said side wrap extensions, each said adjacent edge area including a plurality of flutes configured to mesh with said flutes on a corresponding one of said side wrap extensions.

17. The recyclable shipping container as recited claim 1, wherein said second panel further includes a support flap located along said second edge of said second panel.

18. A recyclable shipping container, comprising:
a. a rectilinear or square blank with two parallel side edges and parallel top and bottom edges, said blank being made of single face corrugate that includes an outer liner and a corrugated medium with a plurality of parallel, inward facing flutes formed thereon, each said flute includes a longitudinal axis, said blank includes a transversely aligned fold line parallel to said top and bottom edges that divides said blank into a first panel and a second panel, when said blank is folded along said fold line, said first panel is stacked over said second panel and said side edges on said first panel are attached to said side edges on said second panel, thereby forming a shipping container with an interior pocket and a top opening, said flutes being parallel to said side edges of said blank, said flutes on at least one said panel being different sizes; and
b. a foldable extension flap formed along a top edge of said second panel of the blank, said foldable extension flap extends upward and transversely along said top edge of said second panel and is configured to be selectively folded over and adhesively attached to a top edge of said first panel of the blank to close said interior pocket of said shipping container.

19. The recyclable shipping container as recited in claim 16, wherein said flutes on said panels when said panels are folded to form a shipping container are offset from each other.

20. A recyclable shipping container, comprising:
a. a rectilinear or square blank with two parallel side edges and parallel top and bottom edges, said blank being made of single face corrugate that includes an outer liner and a corrugated medium with a plurality of parallel, inward facing flutes formed thereon, each said flute includes a longitudinal axis, said blank includes a transversely aligned fold line parallel to said top and bottom edges that divides said blank into a first panel and a second panel, when said blank is folded along said fold line, said first panel is stacked over said second panel and said side edges on said first panel are attached to said side edges on said second panel, thereby forming a shipping container with an interior pocket and a top opening, said flutes being parallel to said side edges of said blank, said flutes including a first group on said first panel that line the interior pocket and a second group on said second panel that line the interior pocket, the first group of said flutes being offset to the second group of said flutes, and the first group of said flutes and the second group of said flutes nest within each other; and
b. a foldable extension flap formed along a top edge of said second panel of the blank, said foldable extension flap extends upward and transversely along said top edge of said second panel and is configured to be selectively folded over and adhesively attached to said top edge of said first panel to close said shipping container.

21. A recyclable shipping container, comprising:
a. a rectilinear or square blank with two parallel side edges and parallel top and bottom edges, said blank being made of single face corrugate that includes an outer liner and a corrugated medium with a plurality of parallel, inward facing flutes formed thereon, each said flute includes a longitudinal axis, said blank includes a transversely aligned fold line parallel to said top and bottom edges that divides said blank into a first panel and a second panel, when said blank is folded along said fold line, said first panel is stacked over said second panel and said side edges on said first panel are attached to said side edges on said second panel, thereby forming a shipping container with an interior pocket and a top opening, said flutes being parallel to said side edges of said blank;
b. a foldable extension flap formed along a top edge of said second panel of the blank, said foldable extension flap extends upward and transversely along said top edge of said second panel and is configured to be selectively folded over and adhesively attached to said top edge of said first panel to close said shipping container; and
c. a flat surface between the flutes and a respective side edge of at least one of the first and second panels.

22. The recyclable shipping container of claim 21, wherein the flat surface includes no flutes.

23. The recyclable shipping container of claim 21, wherein the flat surface is a respective surface of a side wrap extension, said side wrap extension is a portion of at least one of the first and second panels, and the side wrap extension is configured to be folded over said adjacent side edge of said opposite one of the first and second panels to connect said side edges of said first panel and said second panel.

24. The recyclable shipping container of claim 23, wherein the flat surface includes no flutes.

25. The recyclable shipping container of claim 21, wherein the flat surface is a surface of the corrugated medium.

* * * * *

UNITED STATES PATENT AND TRADEMARK OFFICE
CERTIFICATE OF CORRECTION

PATENT NO. : 11,970,325 B2  
APPLICATION NO. : 17/778339  
DATED : April 30, 2024  
INVENTOR(S) : James Boshaw et al.

Page 1 of 1

It is certified that error appears in the above-identified patent and that said Letters Patent is hereby corrected as shown below:

On the Title Page

Item (57) Abstract, Line 12:
"opening, Formed on"
Should read:
--opening. Formed on--.

In the Claims

Column 9, Claim 17, Line 9:
"as recited claim 1,"
Should read:
--as recited in claim 1,--.

Signed and Sealed this
Sixteenth Day of July, 2024

Katherine Kelly Vidal
*Director of the United States Patent and Trademark Office*